United States Patent [19]
Fletcher

[11] 3,911,985
[45] Oct. 14, 1975

[54] SURFACE GRIPPING PRONG DEVICE

[75] Inventor: Kemper H. Fletcher, Kingsport, Tenn.

[73] Assignee: The Raymond Lee Organization, Inc., New York, N.Y. ; a part interest

[22] Filed: Nov. 19, 1974

[21] Appl. No.: 525,162

[52] U.S. Cl. ................. 152/208; 152/225; 152/169
[51] Int. Cl.² .......................................... B60C 27/02
[58] Field of Search ........... 152/208, 168, 167, 170, 152/225–230

[56] References Cited
UNITED STATES PATENTS
| | | | |
|---|---|---|---|
| 2,910,105 | 10/1959 | Binegar | 152/225 R |
| 3,289,727 | 12/1966 | Marks | 152/225 R |

Primary Examiner—Drayton E. Hoffman
Assistant Examiner—Norman L. Stack, Jr.
Attorney, Agent, or Firm—Daniel Jay Tick

[57] ABSTRACT

A disc-type member is coaxially positioned around an axle of a vehicle in proximity with a wheel thereof affixed to the axle. A plurality of rod-like surface gripping prongs are equiangularly pivotally affixed to the wheel and slidably mounted on the disc-type member. A control device is coupled to the disc-type member for selectively rotating the disc-type member around the axis in a manner whereby the prongs are selectively positioned with their ends farthest from the axle within the diameter of a tire on the wheel whereby the prongs are free from contact with a surface supporting the tire and with their ends farthest from the axle extending beyond the diameter of the tire whereby the prongs grip the surface.

2 Claims, 3 Drawing Figures

SURFACE GRIPPING PRONG DEVICE

DESCRIPTION OF THE INVENTION

The present invention relates to a surface gripping prong device.

Objects of the invention are to provide a surface gripping prong device of simple structure, installable with facility and convenience on new and existing vehicles, which functions efficiently, effectively and reliably to provide retractable ice gripping prongs whenever desired by the driver of the vehicle without the need for special tires or chains.

In order that the invention may be readily carried into effect, it will now be described with reference to the accompanying drawing, wherein.

In the FIGS., the same components are identified by the same reference numerals.

Figure 1:
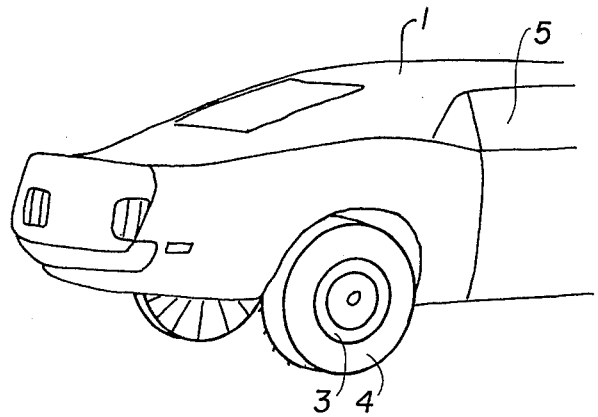
FIG. 1 is a view of a vehicle incorporating the surface gripping prong device of the invention.

The surface gripping prong device of the invention is for a vehicle 1 (FIG. 1) having an axle 2, a wheel 3 affixed to and rotatable with the axle and a tire 4 mounted on the wheel. The vehicle 1 also has a passenger compartment 5 (FIG. 1).

The surface gripping prong device of the invention comprises a disc-type member 6 substantially coaxially positioned around the axle 2 of the vehicle 1 in proximity with the wheel 3 affixed to said axle.

Figure 2:
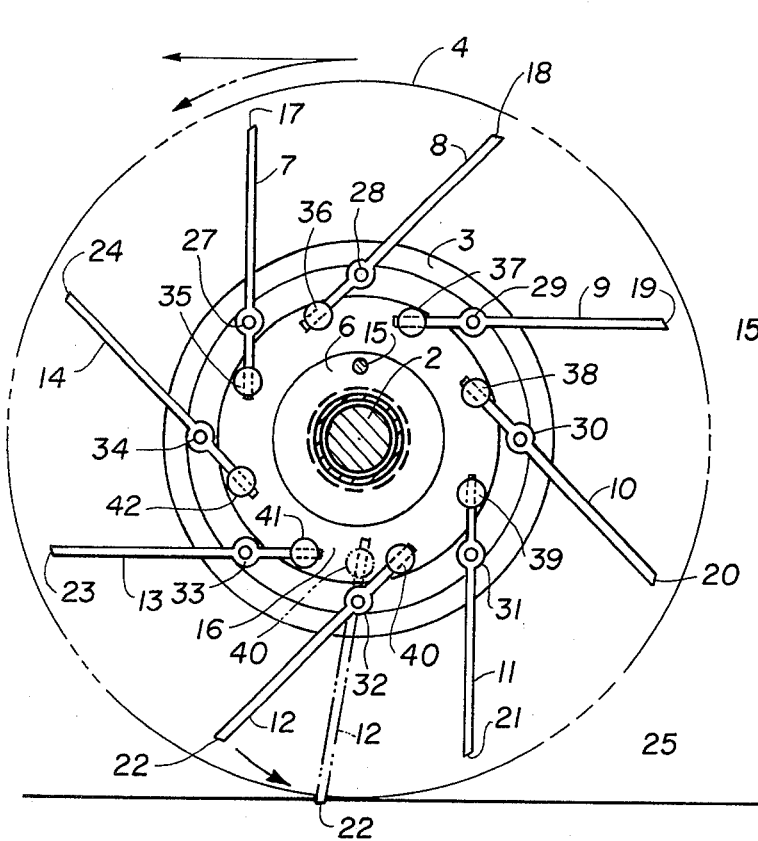
FIG. 2 is an axial view of an embodiment of the surface gripping prong device of the invention.

A plurality of rod-like surface gripping prongs 7, 8, 9, 10, 11, 12, 13 and 14 are substantially equiangularly pivotally affixed to the wheel and are slidably mounted on the disc-type member 6 (FIG. 2).

A control device of any suitable type such as, for example, a control rod 15 (FIGS. 2 and 3) is coupled to the disc-type member 6 via a control disc 16 (FIGS. 2 and 3) substantially coaxially positioned around the axle 2 in proximity with said disc-type member and affixed to said disc-type member. The control device 15 extends from the passenger compartment 5 of the vehicle 1 and selectively rotates the disc-type member 6 around the axle 2 in a manner whereby the prongs 7 to 14 are selectively positioned with their ends 17, 18, 19, 20, 21, 22, 23 and 24, respectively, farthest from the axle 2, within the diameter of the tire 4 whereby the prongs are free from contact with a surface 25 supporting the tire, as shown by solid lines in FIG. 2.

When the control device 15 is operated from the passenger compartment 5 of the vehicle 1 to rotate the disc-type member 6 in the direction of an arrow 26 (FIG. 2), the ends 17 to 24 of the prongs 7 to 14 extend beyond the diameter of the tire 4 whereby the prongs grip the surface 25, as indicated by the broken line representation of the prong 12 in FIG. 2.

Each of the prongs 7 to 14 is slidably affixed at one end at a point spaced from the pivot point thereof. Thus, each of the prongs 7 to 14 is pivotally affixed to the wheel 3 at an intermediate point 27, 28, 29, 30, 31, 32, 33 and 34, respectively, along its length. The end of each of the prongs 7 to 14 closest the pivot point 27 to 34, respectively, is slidably mounted in a guide member mounted on the disc 6 and having a bore formed therethrough and accommodating the prong. Thus, the corresponding end of each of the prongs 7 to 14 is slidably mounted in a guide member 35, 36, 37, 38, 39, 40, 41 and 42, respectively. Thus, in one position of the disc-type member 6, the prongs 7 to 14 extend substantially radially, and their ends 17 to 24, respectively, farthest from the axle 2 extend beyond the diameter of the tire 4 to the surface 25 supporting the tire. In another position of the disc-type member 6, as shown in FIG. 2, the prongs 7 to 14 extend substantially tangentially to the axle 2 and their ends 17 to 24, respectively, are within the diameter of the tire 4.

Figure 3:
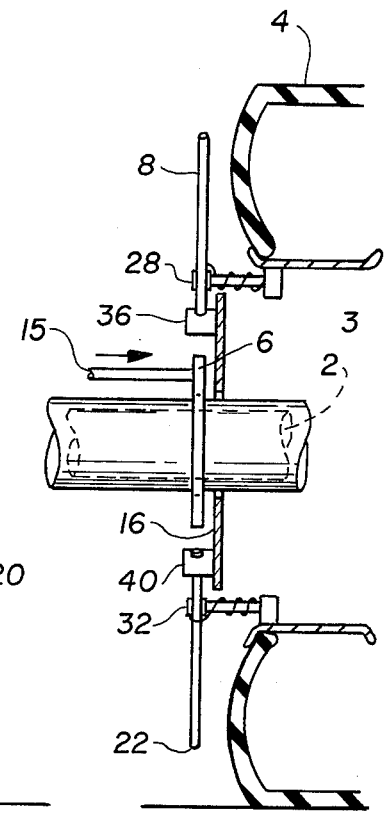
FIG. 3 is a diametrical sectional view of the embodiment of FIG. 2.

The control disc or clutch ring 6 is pushed, via the control rod 15, and rubs against the disc-type member or spider disc 16. There is no connection between the disc 16 and the control disc 6. The disc 16 rotates with the wheel 3. When the control disc 6 is pushed against the disc 16, the disc 16 slows relative to the wheel 3. The prong 8 swings to a radial position as the guide member 36 on the disc 16 tends to line up radially with the point 28. As shown in FIG. 3, springs are biased to keep the prongs to the inside when not required.

While the invention has been described by means of a specific example and in a specific embodiment, I do not wish to be limited thereto, for obvious modifications will occur to those skilled in the art without departing from the spirit and scope of the invention.

I claim:

1. A surface gripping prong device for a vehicle having an axle, a wheel affixed to and rotatable with the axle, a tire mounted on the wheel and a passenger compartment, said surface gripping prong device comprising a disc-type member substantially coaxially positioned around the axle of a vehicle in proximity with a wheel thereof affixed to the axle;

a plurality of rod-like surface gripping prongs substantially equiangularly pivotally affixed to the wheel and slidably mounted on the disc-type member; and control means coupled to the disc-type member for selectively rotating the disc-type member around the axle in a manner whereby the prongs are selectively positioned with their ends farthest from the axle within the diameter of a tire on the wheel whereby the prongs are free from contact with a surface supporting the tire and with their ends farthest from the axle extending beyond the diameter of said tire whereby the prongs grip said surface.

2. A surface gripping prong device as claimed in claim 1, wherein each of the prongs is slidably affixed to the disc-type member at one end at a point spaced from the pivot point thereof whereby in one position of the disc-type member the prongs extend substantially radially and their ends farthest from the axle extend beyond the diameter of the tire to the surface supporting the tire and in another position of the disc-type member extend substantially tangentially to the axle and said farthest ends are within the diameter of the tire.

* * * * *